March 4, 1958  D. HERMAN  2,825,299
VIBRATORY COATING APPARATUS
Filed April 19, 1956

INVENTOR.
DANIEL HERMAN
BY
Leonard H. King
AGENT

United States Patent Office 2,825,299
Patented Mar. 4, 1958

2,825,299

VIBRATORY COATING APPARATUS

Daniel Herman, East Meadow, N. Y., assignor to Myron A. Coler, Scarsdale, N. Y.

Application April 19, 1956, Serial No. 579,390

8 Claims. (Cl. 118—417)

This invention relates to apparatus for forming uniform electrically conductive coatings on electrical insulators.

In many applications for electrical insulators such as synthetic resin compositions, it is desirable that an electrically conductive surface be provided in order to eliminate the formation of electrostatic charges. In electrical measuring apparatus electrostatic charges on windows result in disturbances to sensitive meters. Accordingly, it is desirable to render the surface of the window electrically conductive as as to eliminate the cause of disturbance.

In another typical application, that of aircraft, electrostatic charging of the plastic cockpit canopy and insulating plastic surfaces covering radio and radar antennas creates electrical interference with radio communication and radar signals. The satisfactory coating of these surfaces represent a much more difficult problem than that of the window or the meter. A particularly difficult problem is represented by the canopy. In the canopy application it is essential that the coating provide minimum reduction of light transmission, avoid optical haze effect, avoid optically distorting the pilot's vision and must provide a uniform and even coating. In the copending application of Arnold S. Louis entitled, "Electrically Conductive Article and Method of Producing Same," Ser. No. 340,313, assigned to the assignee of the present application, it is disclosed that by repeatedly impacting the surface of a plastic sheet with conductive material a thin adherent layer of conductive material may be formed on the base. In carrying out the invention coated impactors are employed. The impactors are small spherical balls which are coated with the conductive material such as finely divided graphite. The impactors are caused to repeatedly impinge on the surface of the article to be coated. In particular it was taught that the article to be coated may be suspended in a container filled with coated polystyrene balls approximately 1 mm. in diameter, the polystyrene balls being coated with a thin layer of graphite. By subjecting the balls to a rapid random vibration of small amplitude as for example by attaching to the container a vibrator having a motion of about 0.040" and a frequency of about 60 cycles per second, a coating of graphite is soon built up on the article being coated.

The foregoing method was felt to be quite adequate for small uniform objects such as simple meter or dial or small pieces of flat sheet. However, when complex curved shapes such as aircraft canopies some six feet by three feet wide and two feet in height were treated in accordance with this process, it was found that non-uniformity of coating resulted.

It was noted that such coatings were particularly apt to be non-uniform as to electrical conductivity near the edges of the articles being coated, also that at times distinct "node" patterns would be developed.

Briefly stated, this invention provides a screen rigidly positioned in close proximity to the article to be coated so that when the impactors are vibrated the screen serves to prevent the formation of nodes and uniformize the coating.

Accordingly, it is an object of this invention to provide an improved vibratory means for coating electrical insulators.

It is a particular object of this invention to provide a vibratory coating bed incorporating a screen member.

A further object of this invention is to provide an apparatus for forming uniform transparent electrically conductive coatings on insulator bases.

Another object is to provide a process for making uniform electrically conductive coatings on synthetic resin articles.

Still other objects and advantages will become obvious and still others will be pointed out with particularity as the following description proceeds. In the description reference will be made to the accompanying drawing wherein like characters in the various figures refer to like members.

Figure 1:
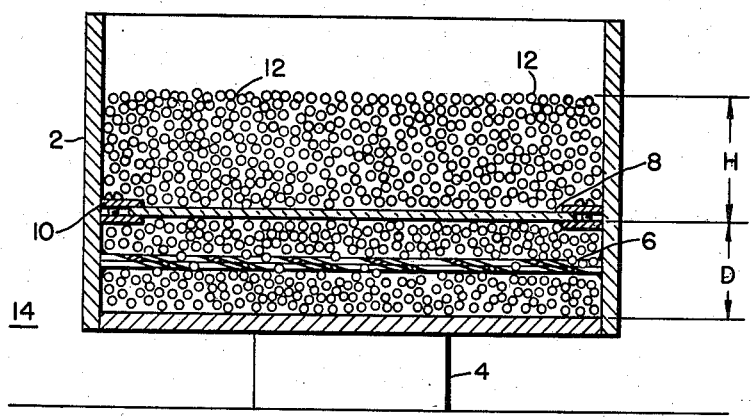
Figure 1 is a cross-section of a vibratory bed of impactors wherein there is incorporated the screen of this invention.
Figure 2:
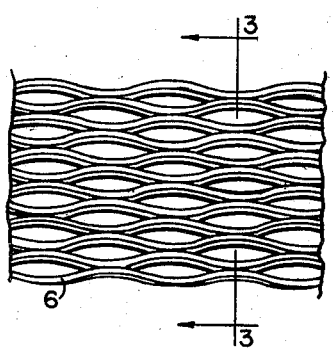
Figure 2 shows a section of a preferred screen.

Referring now to the drawings, in Figure 1 there is shown a container 2 mounted on an electromagnetic vibrator 4. Within the container there is rigidly positioned a screen 6. A section of the screen 6 is shown full size in Figure 2. The article 8 to be coated is clamped into the container 2 by means of clamps 10. Coated impactor members 12 complete what is termed the vibrator "bed" 14.

Figure 3:
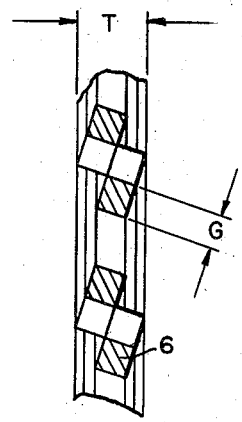
Figure 3 is a cross-section of the screen of Figure 2 taken along plane 2—2.

Screen 6 is preferably of the expanded metal type, having a cross section generally as shown in Figure 3, wherein the overall thickness "$t$" of the screen is substantially greater than the gauge "$g$" of the metal employed. This difference in dimension results from the twisting of portions of the sheet in the expanding process. A screen particularly useful for this purpose is the metal lath type of screen commonly employed as a base for plaster walls.

Screen 6 should be in relatively close proximity to article 8 and should conform to the shape of the latter. It should be positioned approximately equally distant from all surfaces to be coated. The separation between the article 8 and screen 6 should be between ¼" and 2" and preferably from ½" to 1".

This type of screen, which has faces at an angle to the normal direction of vibration, is preferred over a flat screen because a "kicking" and directional dispersing effect is provided to the impactors.

In carrying out the invention the first operation is the preparation of the coated impactors which is accomplished as follows:

A 55 gallon steel drum is rotated at the rate of 60 R. P. M. It is preferred that the drum be filled with baffle plates along the inner wall parallel to the axis of revolution to provide a cascading effect.

The drum is charged with 50 pounds of 1 mm. polystyrene beads (XXX grade Koppers Co. Inc.) and 0.1 pound of finely divided graphite (grade 200–10 "Micronized" graphite, Dixon Crucible Co.) and tumbled for 16 hours.

The resulting coated impactors 12 are placed in container 2 which is arranged to be vibrated by an electromagnetic vibrator 4 as claimed in the copending application of Arnold S. Louis, Serial Number 340,313, entitled, "Electrically Conductive Article and Method of Producing Same;" filed approximately March 4, 1953.

The impactors 12 of bed 14 should be conditioned to uniformize them. This is accomplished by vibrating them for about 4 hours before the article 8 which is to be coated is clamped into position by means of clamps 10.

It is essential to maintain a supply of impactors several inches above the article 8 being coated so as to provide a "head," "$h$."

The bed of agitated impactors appears to exercise a pressure on objects immersed in it somewhat after the fashion of the hydrostatic pressure exerted by a column of liquid. A minimum bed having a dimension "$d$" of about 2" appears to be needed to achieve a minimum coating rate.

Rate of coating or corresponding degree of coating after a given exposure time is in part dependent on the head, "$h$." The head may be replaced by positioning weights on the object being coated, if the shape of the object is such, e. g. (a horizontal flat sheet) as to transmit the weight to the bed. If weights are employed the article 8 should not be rigidly clamped in place.

Thus while I have disclosed what is currently believed the best mode of carrying out the invention it is to be understood that changes may be made without departing from the spirit of the invention and that accordingly I wish to be limited only by the scope of the appended claims.

What is claimed is:

1. In an apparatus for coating articles with a material by means of vibrating impactors bearing a finely divided surface layer of said material, the combination of a screen having a configuration substantially the same as said article and arranged to be positioned in close proximity to said article.

2. The apparatus of claim 1 wherein said screen is spaced between ¼" and 2" from said article.

3. The apparatus of claim 1 wherein said screen is spaced between ½" and 1".

4. The apparatus of claim 1 wherein said screen is provided with a plurality of faces at an acute angle to the plane of said screen.

5. The apparatus of claim 1 wherein said screen has a thickness in excess of the gauge of the material forming said screen.

6. An apparatus for coating articles with a material by means of vibrating impactors bearing a finely divided surface layer of said material, the combination of a container for said impactors, means for vibrating said impactors, a screen rigidly mounted in said container, means for mounting articles to be coated in close proximity to said screen.

7. The apparatus of claim 6 wherein said screen is provided with a plurality of faces at an acute angle to the plane of said screen.

8. The apparatus of claim 6 wherein said screen has a thickness in excess of the gauge of the material forming said screen.

References Cited in the file of this patent

UNITED STATES PATENTS 2,616,391     Russell _____ Nov. 4, 1952